United States Patent [19]
Tomabechi

[11] Patent Number: 5,260,944
[45] Date of Patent: Nov. 9, 1993

[54] DYNAMIC CHANNEL ALLOCATION METHOD

[75] Inventor: Akitaka Tomabechi, Yokohama, Japan

[73] Assignee: Matsushita Electric Industrial Co., Ltd., Osaka, Japan

[21] Appl. No.: 740,511

[22] Filed: Aug. 5, 1991

[30] Foreign Application Priority Data

Aug. 9, 1990 [JP] Japan .................................. 2-212522

[51] Int. Cl.$^5$ ............................................. H04J 3/16
[52] U.S. Cl. ........................................ 370/95.1; 370/29
[58] Field of Search ................. 370/95.1, 95.3, 85.2, 370/79, 24, 104.1, 29, 30, 31; 379/59, 60; 455/12, 33, 56, 12.1, 33.1, 33.2, 33.3, 33.4, 56.1

[56] References Cited

U.S. PATENT DOCUMENTS

| | | | |
|---|---|---|---|
| 4,686,673 | 8/1987 | Hotta | 370/104.1 |
| 4,928,273 | 5/1990 | Protopapas | 370/95.1 |
| 4,949,395 | 8/1990 | Rydbeck | 379/60 |
| 4,977,580 | 12/1990 | McNicol | 370/95.3 |

Primary Examiner—Douglas W. Olms
Assistant Examiner—Shick Hom
Attorney, Agent, or Firm—Spencer, Frank & Schneider

[57] ABSTRACT

A dynamic frequency allocation method of a digital, mobile, portable telephone system wherein in communications between a plurality of base stations which are connected to a public telephone network and/or a private branch exchange and which respectively generate synchronization in an independent manner and mobile stations receiving service therefrom, each base station uses a communication signal transmission channel including a frequency and a time slot pair respectively selected from a plurality of frequencies and a plurality of time slots related thereto to implement a multichannel time division multiplex/time division duplex communication. Each of the base and mobile stations receives a communication signal of a different station communicating with synchronization independent of the pertinent station by use of a different time slot at the same frequency of the channel used by the station to receive a communication sent thereto so as to measure an interval or a distance between the time slot used by the different station and the time slot assigned thereto. Based on the measurement result, a chance of a collision between these two time slots is estimated such that depending on the estimation result, the pertinent station detects free channels not being used by any other stations to conduct a channel transition to one of the detected free channels.

24 Claims, 4 Drawing Sheets

DYNAMIC CHANNEL ALLOCATION METHOD

BACKGROUND OF THE INVENTION

1. Field of the Invention

The present invention relates to a method of dynamically allocating frequencies for use in a digital, mobile, portable telephone system achieving communications using a multicarrier time division multiple access (TDMA), and in particular, to a dynamic frequency allocation method for use with a plurality of asynchronous digital, mobile, portable telephone systems capable of preventing radio inferences due to interferences between the respective systems.

2. Description of the Related Art

Recently, the mobile communications have been developed to an amazing extent; especially, the mobile portable telephone systems have been put to various usages.

In the present stage of technology of the mobile portable telephone, there has been commonly adopted a frequency division multiple access (FDMA) system in which a radio communication is achieved by use of a particular frequency in a one-to-one type procedure between a mobile station and a base station wired to a fixed telephone network.

In the mobile portable telephone systems employing the FDMA procedure, carrier selection ranges assigned to the respective systems are different from each other such that each system is allowed to exclusively utilize a unique carrier. In consequence, considerations need not be given to the possibility of common uses of an identical carrier between two or more systems.

On the other hand, there has been employed a multiplex communication system other than the FDMA communication system above, namely, a TDMA multiplex communication system in which a carrier having a preset frequency is subdivided with respect to time for communications.

The TDMA multiplex communication system has already been used in a communication system conducting communications between fixed stations. In particular, there has been adopted in many cases a multicarrier TDMA communication system using a plurality of carriers in which each carrier is subdivided into a plurality of time slots. When a communication is achieved between a fixed central station and a fixed terminal station, a channel search is carried out through the channels each defined by a combination of a carrier frequency and a time slot to select therefrom a free channel not being used for a communication between other central and terminal stations, thereby achieving the communication.

In the conventional multiplex communication of the multicarrier TDMA procedure between the fixed central station and the fixed terminal, carrier selection ranges allocated to the respective communication systems between the fixed stations are different from each other. Namely, the communication is accomplished therebetween in accordance with a slaved or subordinate synchronization in which a fixed terminal station establishes synchronization with respect to a fixed central station in a subordinate manner.

As a result, in an identical communication system between fixed terminal stations, there does not occur an interference between the terminal stations; moreover, the carrier selection ranges vary between the communication systems, thereby unnecessitating the users to consider the possibility of the common use of an identical carrier between the systems.

Incidentally, in the mobile portable telephone communication and an automobile telephone communication employing digitalized or digital signals, adoption of the multicarrier TDMA communication system has been discussed for the following reasons. Namely, in each communication system, the base station is allowed to access a plurality of mobile stations to decrease the number of base stations to be installed, thereby reducing the system cost; furthermore, the communication system is capable of coping with an increase in the number of subscribers without installing additional base stations.

In the TDMA procedure in the mobile portable telephone system and the automobile telephone system employing the digital signals, the base station and the mobile station respectively correspond to the central station and the terminal station disposed in the conventional TDMA communication system between the fixed stations.

However, since the mobile portable telephone system and the automobile telephone system employing the digital signals are characterized in that the respective terminal stations are mobile, namely, are not fixed, it is difficult to allocate a fixed carrier frequency to be used by each pair of a base station and a mobile station.

In order to overcome this difficulty, there is used a dynamic channel allocation. That is, the carrier used by the pair of a base station and a mobile station is not fixed such that a pair of a mobile station and a base station ordinarily in a state waiting for a fixed carrier searches a plurality of carriers for a free channel or an available channel at initiation of a communication, thereby conducting the communication through the channel.

Under this condition, in the case of the automobile telephone system, since a connection object to which the central station i.e. the automobile telephone base station of the TDMA communication system is to be connected is an automobile telephone network, when the base station of each automobile telephone system establishes a subordinate synchronization with respect to synchronization of the automobile telephone network, the synchronization between the respective base stations, namely, between the automobile telephone systems can be kept retained. This consequently guarantees the base stations to allocate the respective time slots thus attained through the time division to the associated terminal stations without any fears of interferences between the automobile telephone systems.

Unlike the automobile telephone system, the connection object of the mobile portable telephone system of the former case is in general a public telephone or pay station network (PSTN), a private branch exchange (PBX), or the like. Consequently, when achieving the subordinate synchronization with respect to these networks, it is quite difficult to acquire a synchronization timing signal from the network side. As a result, in each mobile portable telephone system, the base station is disadvantageously required to independently generate a transmission clock signal.

In this regard, conventionally, according to the carrier selection method adopted in the mobile portable telephone communication, each telephone system selects a carrier from a carrier range uniquely assigned thereto, and hence it is not necessary for each base station to comprehensively control the carrier ranges related to all base stations. That is, there has not been disposed a device for the comprehensive carrier control.

In consequence, when the TDMA procedure is utilized in the mobile portable telephone communication of the prior art, since any base station of a telephone system cannot recognize a carrier selected by a base station of another system, there may possibly occur a chance where an identical carrier is selected by a plurality of base stations in the mobile portable telephone communication.

In this situation, however, the base station of each system independently generates the transmission clock signal as described above. Consequently, when the transmission clock frequencies are not synchronized with each other between the base stations of the respective telephone systems and the widths of the transmission clock signal are different from each other between a plurality of base stations selecting an identical carrier, the synchronization timing of the time slot varies between the respective systems.

FIGS. 5 and 6 show the signal operation states in the situations above.

First, FIG. 5 is a signal timing chart showing with bipolar pulse images a state of a communication initiation in which base stations KS1 and KS2 of two different telephone systems respectively start communications with mobile stations PS1 and PS2 by using different time slots of an identical carrier. In this chart, the upper and lower portions respectively show communication states developed in the base stations KS1 and KS2, respectively.

In the diagram of FIG. 5, a division of each axis of abscissa represents a time slot, and the numerals over and below the axis designate numbers assigned to the associated time slots. Moreover, time slots shown over the axis are respectively used to transmit signals from the base stations KS1 and KS2 to the mobile stations PS1 and PS2, respectively. In addition, time slots shown beneath the axis are respectively employed to send signals from the mobile stations PS1 and PS2 to the base stations KS1 and KS2, respectively.

Furthermore, time slots each enclosed in a frame are respectively acquired by a pair of the base station KS1 and the mobile station PS1 and a pair of the base station KS2 and the mobile station PS2 in an independent manner for communications.

In the chart of FIG. 5, the base station KS1 initiates a communication in a first time slot of a carrier; whereas, the base station KS2 starts a communication in a third time slot of the same carrier.

However, these two base stations KS1 and KS2 operate in an asynchronous manner with respect to each other and the transmission clocks respectively thereof are generated in a separate fashion. Consequently, an interval of time slots generated by the base station KS1 is not necessarily equal to that of the time slots produced by the base station KS2.

When the transmission clock interval of the transmission clocks created by the base station KS1 is different from that of the transmission clocks generated by the base station KS2, a difference between the transmission timings for the time slot of the base station KS1 and that of the base station KS2 varies. For example, when the time slot length of the pair of the base station KS1 and the mobile station PS1 is less than that of the pair of the base station KS2 and the mobile station PS2, the third time slot used by the base station KS2 is shifted, with a lapse of time, backward relative to the first time slot utilized by the base station KS1.

As a result, the interval of about at least 2.5 slots between the first slot employed by the base station KS1 and the third time slot used by the base station KS2 at the initiation of the communication shown in FIG. 5 is changed or decreased with a lapse of time to the state of FIG. 6. Namely, the interval between the slots is gradually decreased and hence signals transmitted from the respective stations may cause interferences with each other in some cases.

More concretely, on confirming that these time slots do not interfere with each other at the starting point of the communication, the base stations KS1 and KS2 acquire these time slots for communication. FIG. 5 shows relationships between the time slots at the initiation of the communication. The state of these time slots is then changed, in this case, the distance therebetween is reduced as shown in FIG. 6. This inevitably leads to a problem of an occurrence of a collision which is an overlap in time between time slots used by the base stations and hence deteriorates the speech or telephone communication quality.

SUMMARY OF THE INVENTION

It is therefore an object of the present invention to provide a dynamic frequency allocation method wherein prior to an occurrence of a collision between a time slot used in a base station (own base station) and a time slot employed by another base station, another free channel is selected to change the channel to be used by the own station so as to prevent the collision with the time slot adopted by another base station. Consequently, a multichannel TDMA procedure can be easily applied to a plurality of existing cordless telephone systems operating in the FDMA procedure in an asynchronous manner with respective to each other, thereby removing the problem of the prior art.

In order to achieve the object above, according to the present invention, in a communication through a mobile radio communication path between a plurality of base stations which are connected to a network and independently establish synchronization of each other and mobile stations receiving services from the base stations, there is employed a communication signal transmission channel defined by a combination of a frequency and a time slot. That is, each base station is capable of selecting, from a plurality of frequencies and a plurality of time slots associated with the respective frequencies, a frequency and a time slot, thereby achieving a communication in conformity with a multichannel time division multiplex/duplex communication procedure. Each of the base and mobile stations in the respective telephone systems uses different time slot at a frequency identical to a frequency of a channel employed to receive a communication signal transmitted to the own station. The pertinent (own) station of the telephone system receives a communication signal of a different station which uses a different time slot at the same frequency as used by the own station with a synchronization independent of the own station so as to measure a distance between the time slot used by the different station and that employed by the own station. Based on the result of the measurement, the station estimates a collision between the time slot of its own and that used by the different station. All free channels not used by any other station are detected and the channels being used by the station and a station communicating therewith are replaced simultaneously with the detected free channels prior to an occurrence of the collision.

Moreover, in order to avoid the collision between the time slots at the same frequency, each of the base and mobile stations receives a communication signal between different stations communicating by use of a different time slot at the same frequency as used by the own station with synchronization independent of the own station so as to detect the signal level of the communication signal between the different station. The reception level of the communication signal received from the different station is compared with that of the communication signal destined to the own station. When the reception level of the communication signal from the different station is recognized, as a result of the comparison, to be strong enough to interfere with the communication signal destined to the own station, the own station detects all free channels not used by any other station. The channels being used by the own station and a station communicating therewith are replaced simultaneously with the detected free channels prior to occurrence of the collision.

Consequently, in accordance with the present invention, the own station detects a period of a carrier used by a different station to compare the frequency period with that of the own carrier. Based on the comparison result, the own station recognizes that the time slot thereof is in the vicinity of a time slot of the carrier used by the different station. With this provision, each station generating a unique transmission clock to establish a frame synchronization is capable of selecting, prior to an occurrence of a collision between the time slot used by the pertinent station and that employed by the different base station, free channels to achieve a channel change-over operation for the communication. In consequence, the collision of the own time slot with the time slot adopted by the different base station can be prevented. As a result, the multichannel TDMA procedure can be easily introduced to a plurality of existing wireless telephone systems operating in an asynchronous manner in the FDMA procedure.

BRIEF DESCRIPTION OF THE DRAWINGS

These and other objects and advantages of the present invention will, become apparent by reference to the following description and accompanying drawings wherein.

DESCRIPTION OF THE PREFERRED EMBODIMENTS

Referring now to the accompanying drawings, a description will be given of an embodiment according to the present invention. Let us assume here that the description will be given of an example of a digital, mobile, portable telephone system wherein a signal is transmitted through a mobile radio communication path between a base station physically wired to a network such as a PSTN and a PBX related to the ISDN or the like and a mobile station coupled with the base station via a mobile radio communication route as follows. That is, there is implemented an 8-channel, multicarrier, TDMA/TDD multiplex communication system in which a TDMA communication system and a (TDD) communication system are simultaneously accomplished through a carrier.

1. Frame format for the signal transmission via mobile radio communication path (FIGS. 1 and 2)

As described above, a signal is transmitted via a mobile radio communication path between a base station and a mobile station according to an 8-channel TDMA/TDD multiplex communication system implementing both of the TDMA and TDD communication systems on a carrier.

In order to conduct the 8-channel TDMA/TDD multiplex communication, the following TDMA frame, which will be described below, is adopted as a frame format for the signal transmission.

Figure 1:
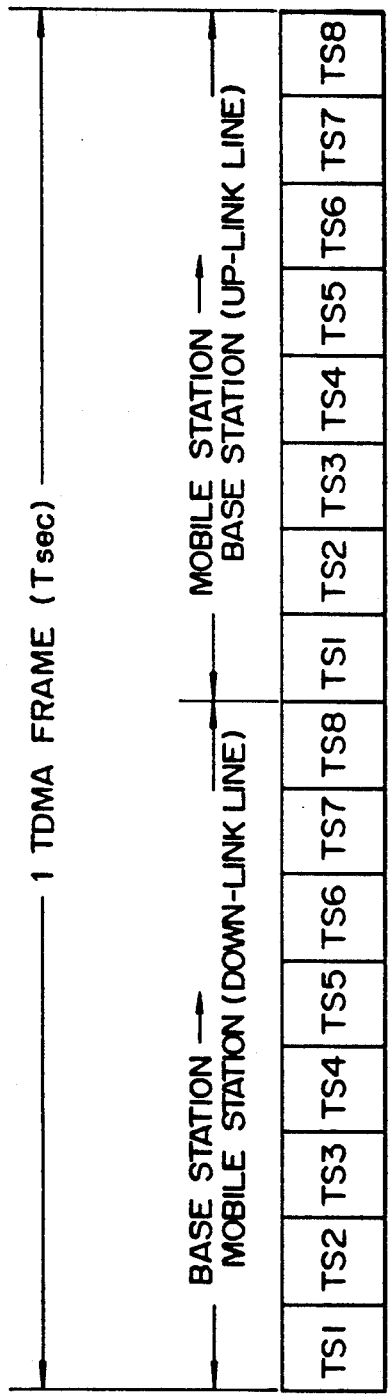
FIG. 1 is a schematic diagram showing a TDMA frame in an 8-channel TDMA/TDD (time division duplex) transmission format via a mobile radio communication path used in a mobile portable telephone system employing a dynamic channel allocation method in an embodiment according to the present invention.
Figure 2:
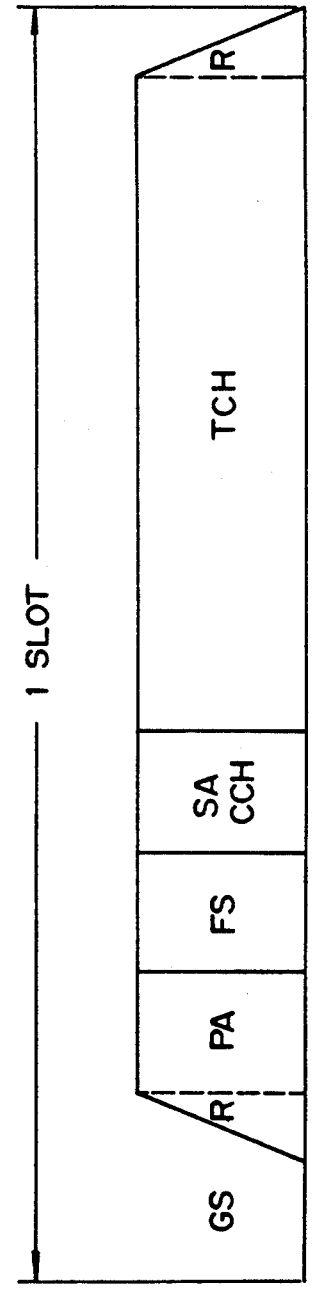
FIG. 2 is a diagram illustratively showing the structure of a channel burst signal to be transmitted in each time slot of the TDMA frame of FIG. 1.

1-1 Frame (FIG. 1)

The TDMA frame used here is that used in a general 8-channel TDMA/TDD transmission format. Each TDMA frame has a period decided depending on a transmission clock signal created by each base station. Assuming the period of the clock signal to be T seconds, a TDMA frame is generated by dividing the period T by 16 to create 16 time slots. Namely, each time slot is employed as the TDMA frame for the following reason.

That is, in order to accomplish the TDD signal transmission, a TDMA frame is split into two blocks including a first-half block and a second-half block; moreover, to carry out the 8-channel multiplex TDMA signal transmission, each of these blocks is further subdivided into eight time slots of which the contents thereof are shown in FIG. 1.

As can be seen from the TDMA frame of FIG. 1, in order to accomplish the TDD signal transmission, the first-half and second-half portions thereof are respectively assigned to a base-to-mobile communication i.e. a base station transmission/mobile station reception (down-link) and to a mobile-to-base communication i.e. a mobile station transmission/base station reception (up-link). Moreover, to achieve the 8-channel TDMA signal transmission, each of the first-half and second-half portions is further partitioned into eight time slots (TSs) ranging from a first time slot (TS1) to an eighth time slot (TS8).

The base and mobile stations each are ordinarily in a wait state awaiting a signal reception on a fixed carrier allocated thereto for a transmission of control signals commonly used in the system. At an initiation of a communication, for a signal transmission between the stations, a free channel (a "channel" is defined as a combination of a carrier and a time slot) is selected from a plurality of channels each including either one of the time slots TS1 to TS8 for the down-link and up-link and either one of a plurality of carriers assigned for communications, the free channel not being used for communications between other base station and its mobile stations.

Thereafter, the pertinent base station and the mobile station as a communication partner thereof accomplish communication signal transmissions therebetween in a burst-like manner i.e. in a repeated fashion.

1-2 Structure of Channel Burst Signal (FIG. 2)

When a free channel is selected and is acquired for a communication between a base station and a mobile station, a signal transmission is carried out in a burst-like manner therebetween. In this operation, a channel burst signal transmitted by use of a time slot from the base station or the mobile station is constituted as shown in FIG. 2.

First, the channel burst signal includes a guard space (GS) field as a leading portion disposed to prevent a collision with an adjacent time slot and a ramp (R) field as a subsequent portion for suppressing a level of an interference spectrum radiated in a wide bandwidth due to the rapid or steep rising and falling operations of the signal transmission.

Subsequent to the ramp field, there is disposed a preamble signal (PA) field for establishing a bit synchronization in the station receiving the channel burst signal. The preamble signal field is followed by a frame synchronization signal (FS) field adopted to transmit a unique word so as to supply a synchronization point of the pertinent burst signal to the reception side.

The frame synchronization signal field is followed by a slow auxiliary control channel (SACCH) field disposed to transmit a control signal during a communication. Subsequent to the SACCH field is a traffic channel (TCH) field employed to send a user signal such as an audio signal. The channel burst signal is ended with a ramp (R) field.

Figure 3:
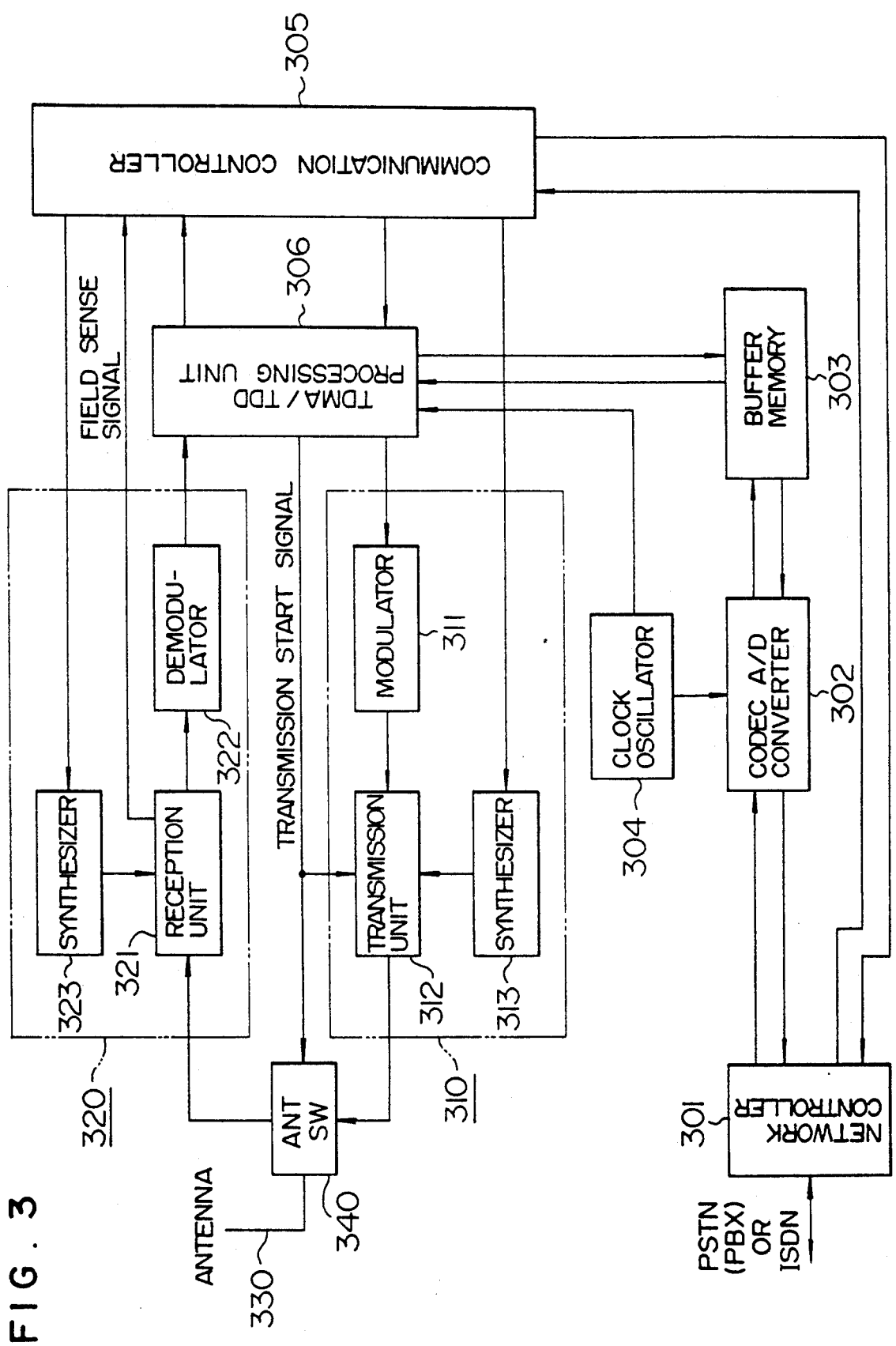
FIG. 3 is a block diagram schematically showing the constitution of a base station in a mobile portable telephone system employing a dynamic channel allocation method in an embodiment according to the present invention.
Figure 4:
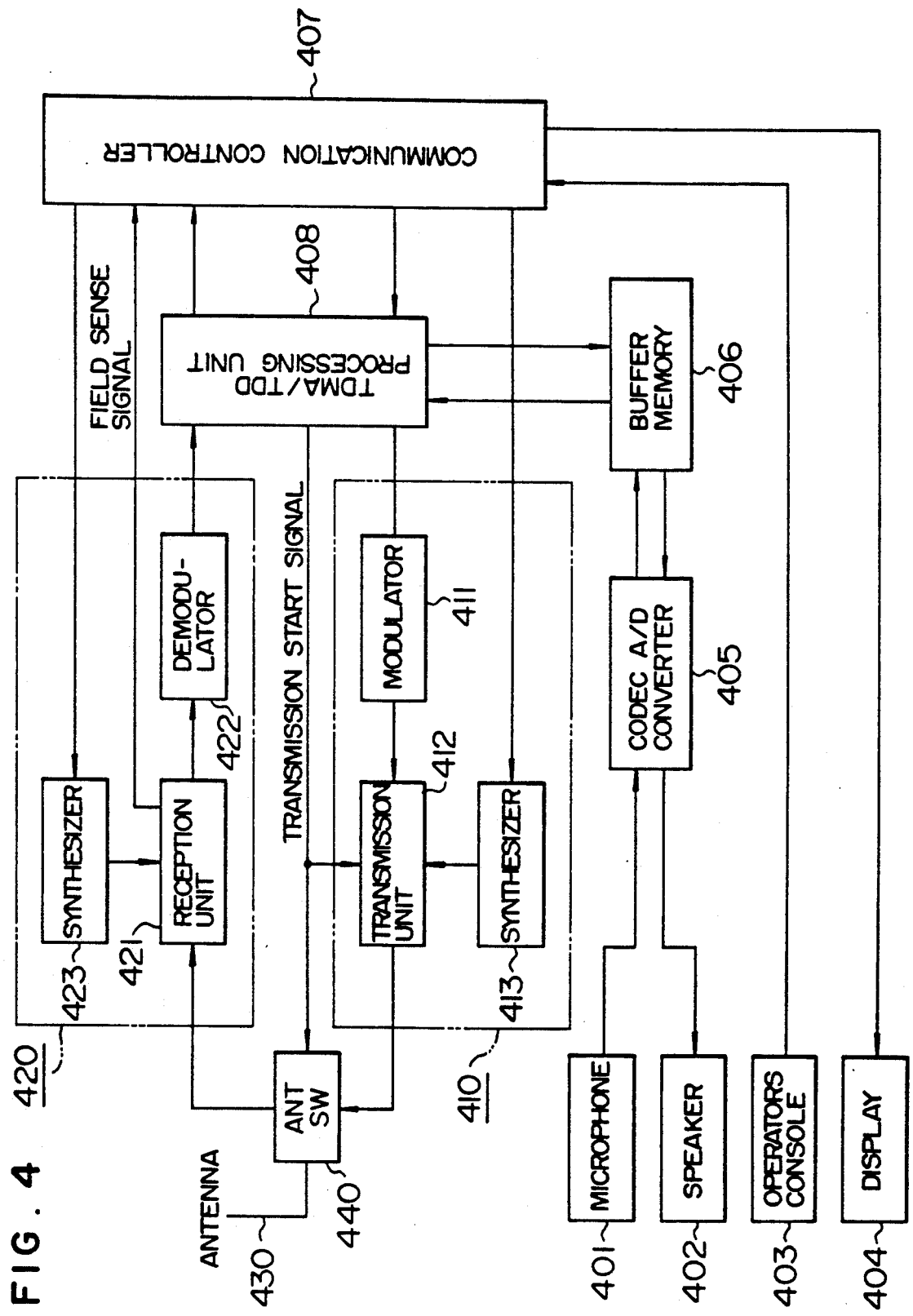
FIG. 4 is a schematic block diagram showing the configuration of a mobile station in a mobile portable telephone system adopting a dynamic channel allocation method in an embodiment according to the present invention.
Figure 5:
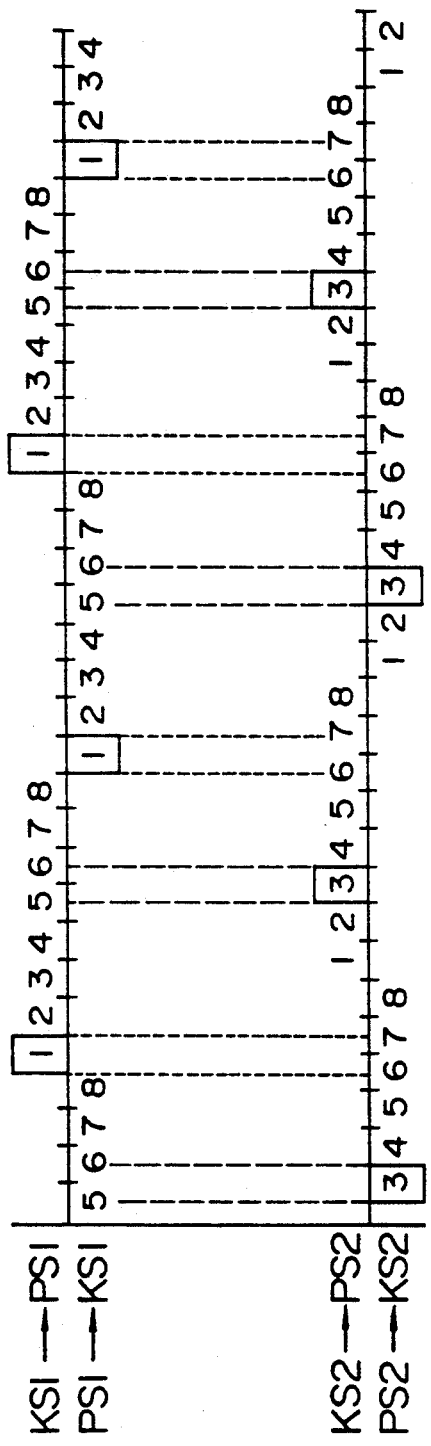
FIG. 5 is a signal timing chart showing relationships with respect to time between time slots allocated to two base stations using an identical carrier at an initiation of a communication.
Figure 6:
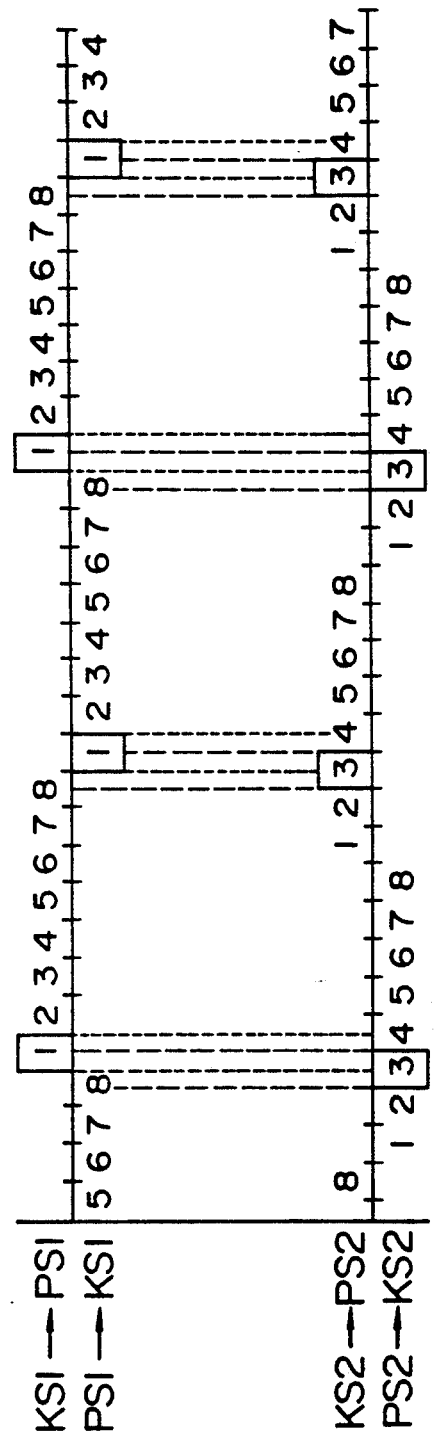
FIG. 6. is a signal timing chart showing a state of a collision occurred between the time slots of the two base stations of FIG. 5 after a lapse of time.

2-2. Structures of Base and Mobile Stations (FIGS. 3 and 4)

In this configuration, a base station is disposed to conduct a radio communication with a mobile station. Namely, as described above, the 8-channel TDMA/TDD multiplex communication is achieved therebetween. In consequence, the base station is capable of conducting an access to a maximum of eight mobile stations at the same time.

Each base station independently generates a clock signal and supplies the clock signal to a mobile station, which will be described later. The clock signal is used by the mobile station to establish a subordinate synchronization with respect to the base station.

A mobile station is used to access a base station in the vicinity thereof so as to carry out a speech communication with a network. The access is accomplished through a communication of control signals on a fixed carrier between the mobile station and the base station.

2-2-(1). Structure of Base Station (FIG. 3)

Referring now to FIG. 3, a description will be briefly given of the configuration of the base station above. In this regard, a term "down-link" utilized in the description denotes a direction of the signal transmission from the base station to the mobile station, whereas "up-link" indicates a direction reverse to the down-link direction.

The structure of FIG. 3 includes a network control unit 301 to be connected to a network such as the ISDN or to a network via a PSTN of a PBX. This unit 301 receives in the down-link direction a signal transmitted from the network side in a burst-like manner and then separates the inputted burst transmission signal into a control signal and a communication signal.

A reference numeral 302 denotes an analog-to-digital (A/D) converter (hereinafter referred to as a "codec" A/D converter) connected to the network control unit 301 for receiving the communication signal thus passed in the down-link direction from the network control unit 301 so as to convert the communication signal such as an encoded audio signal from the network side into an analog signal.

A numeral 303 designates a buffer memory connected to the codec A/D converter 302 to which the communication signal undergone the A/D conversion is supplied in a burst-like manner along the down-link direction. The converted communication signal is temporarily stored in the buffer memory 303.

The configuration further includes a clock signal oscillator circuit 304 for creating a timing pulse to be adopted as a time reference between the base station and a mobile station accessing the base station for communication. The timing pulse is independently generated by each base station in a separated fashion.

A reference numeral 305 denotes a communication control unit connected to the network control unit 301 and through a TDMA/TDD processing unit 306 to the buffer memory 303. In operation along the down-link direction, the communication control unit 305 receives the control signal sent from the network side and separated in the network control unit 301, and the communication signal thus stored in the buffer memory 303 through the TDMA/TDD Processing unit 306. On receiving the control signal from the network side, the communication control unit 305 conducts a channel search for a free channel and then creates a call termination text including information of the available channel thus found through the search operation, thereby transmitting the text to the communicating mobile station. The call termination text is used for a negotiation to establish a channel for the subsequent communication.

The constitution of FIG. 3 further comprises the TDMA/TDD processing unit 306 receiving, in operation along the down-link direction, a timing pulse signal from the clock signal oscillator circuit 304, a communication signal from the buffer memory 303, and a control signal from the communication controller 305. In operation in the up-link direction, this unit 306 receives as an input thereto a transmission signal from a receiver unit 320, which will be described later, the transmission signal being transmitted from a mobile station and being received by the receiver unit 320.

The TDMA/TDD processing unit 306 determines, in operation in the down-link direction, the contents of a TDMA frame used to transmit a signal to the mobile station and those of a channel burst signal as shown in FIG. 2 based on the communication and control signals received from the buffer memory unit 303 and the communication control unit 305, respectively.

Thereafter, at a timing synchronized with a timing pulse signal supplied from the clock oscillator circuit 304, the unit 306 above sends in a burst-like manner a transmission signal including the TDMA frame thus prepared for the mobile station to a transmitter unit 310, which will be described later. At the same time, a transmission start signal instructing an initiation of a transmission is delivered to the transmitter unit 310.

In operation in the up-link direction, the TDMA/TDD processing unit 306 processes the transmission signal of the mobile station received from the receiver unit 320, which will be described later. The transmission signal is separated into a control signal and a communication signal, and they are respectively fed to the communication control unit 305 and the buffer memory 303. In addition, the TDMA/TDD processing unit 306 includes therein a frame synchronization sensor circuit, not shown. The sensor circuit is used to monitor the frame synchronization (FS) signal included in the received transmission signal i.e. the channel burst signal.

In this connection, in the up-link signal transmission, on receiving the communication signal from the TDMA/TDD processing unit 306, the buffer memory 303 temporarily stores the communication signal to transmit the signal in a burst or repeated manner to the network control unit 301.

When the control signal from the mobile station is received via the TDMA/TDD processing unit 306, the communication control unit 305 decides, based on the control signal, a channel to transmit communication signals between the own base station and the mobile station. The obtained channel is notified to the TDMA/TDD processing unit 306.

In response to a reception of the notification of the determined channel, the TDMA/TDD processing unit 306 reports a carrier frequency of the channel to the transmitter unit 310 and the receiver unit 320, which will be described later.

Incidentally, the TDMA/TDD processing unit 306 is connected to the transmitter unit 310 and the receiver unit 320 for accomplishing communications with mobile stations. Next, a description will be given of the constitution of the transmitter unit 310 and the receiver unit 320.

First, in FIG. 3, the transmitter unit 310 includes a modulator unit 311 connected to the TDMA/TDD processing unit 306 for modulating a transmission signal received therefrom and a transmission unit 312 connected to the modulator unit 311 for transmitting the modulated transmission signal to a mobile station via an antenna 330 and a mobile radio communication path (not shown).

The receiver unit 320 comprises a reception unit 321 for receiving a transmission signal of the mobile station via the mobile radio path and the antenna 330 so as to sense a reception level of the received signal transmitted from the mobile station. The obtained reception level is notified as a field sense signal to the TDMA/TDD processing unit 306.

The receiver unit 320 includes a demodulator unit 322 connected to the reception unit 321 for demodulating the signal thus received from the mobile station to produce a digital signal, thereby sending the digital signal to the TDMA/TDD processing unit 306.

In addition, there is also disposed an antenna switch 340 between the transmission unit 312, the reception unit 321, and the antenna 330. The antenna switch 340 is connected to the TDMA/TDD processing unit 306 so as to switch the signal connecting direction between the transmission unit 312 and the reception unit 321 based on an instruction supplied from the TDMA/TDD processing unit 306 in response to a timing pulse received from the synchronization controller 302.

The antenna switch 340 is disposed to conduct a change-over between the transmission and reception states of the pertinent base station at a timing synchronized with a timing related to areas associated with the down-link and up-link directions of the TDMA frame in the transmission format on the mobile radio communication path. Ordinarily, in order to receive a control signal by use of a fixed carrier, the connecting direction or point of the antenna switch 340 is set to the side of the reception unit 321.

The antenna switch 340 and the transmission unit 312 are supplied with a transmission start signal outputted from the TDMA/TDD processing unit 306. In response to the signal, the antenna switch 340 changes the connecting direction onto the side of the transmission unit 312, which in turn outputs a transmission signal to the mobile station, the transmission signal being supplied from the TDMA/TDD processing unit 306 via the modulator unit 311.

The transmission unit 312 and the reception unit 321 are respectively connected to synthesizer units 313 and 323 each oscillating a signal with a variable frequency. Thanks to this provision, the frequency of the communication signal of the transmission unit 312 and the reception unit 321 can be arbitrarily altered in response to an instruction from the communication controller 305.

When the pertinent base station is in the wait state, each of the synthesizer units 313 and 323 operates under control of the communication control unit 305 to oscillate a signal with a frequency such that the transmission unit 312 and the reception unit 323 conducts the communication on a fixed carrier predetermined for the control signal transmission. When a speech communication is to be achieved with the network side, the oscillation frequency is varied depending on a free channel available for a communication signal transmission.

For this purpose, like the TDMA/TDD processing unit 306, each of the synthesizers 313 and 323 is supplied with a result of a channel selection for the communication signal transmission received from the communication control unit 305 so as to change the oscillation frequency depending on the channel selection result.

2-2-(2) Structure of Mobile Station (FIG. 4)

Referring now to FIG. 4, a description will be briefly given of the configuration of the mobile station. In the description, it is assumed that the terms "down-link" and "up-link" directions respectively designate a signal transmission direction from the base station side to the mobile station side and the reverse direction thereof.

The configuration of FIG. 4 includes a microphone 401 disposed in a speech transmitting unit, a speaker 402 installed in a speech receiving unit, an operator's console 403, and a display 404 adopted to present thereon an operation state and the like associated with the operator's console 403. These constituent elements form a baseband circuit system.

The configuration further includes a codec A/D converter 405 which receives an audio signal from the microphone 401 in the up-link direction and which produces an audio signal to the speaker 402 in the down-link direction and a buffer memory unit 406 which receives as an input thereto a communication signal (an audio signal) sent in the up-link direction from the microphone 401 via the codec A/D converter 405.

A reference numeral 407 denotes a communication control unit receiving signals such as a dial signal generated through an operation of dial keys in the console 403. Based on a call transmission operation from the console 403, this unit 407 achieving a connection control with a nearby base station thereof creates a control signal to be transmitted as a connection control signal to the nearby base station.

The system of FIG. 4 further comprises a TDMA/TDD processing unit 408 which receives in the up-link operation a communication signal from the buffer memory 406 and a control signal from the communication controller 407 and which is supplied in the down-link operation with a transmission signal from a receiver unit 420, which will be described later, the transmission signal being transmitted from the nearest base station and being received by a receiver unit 420.

The TDMA/TDD processing unit 408 decides in the up-link operation the contents of the TDMA frame for a transmission of a signal to the nearby base station depending on the communication signal and the control signal supplied from the buffer memory 406 and the communication control unit 407, respectively. A transmission signal including the TDMA frame to be sent to the base station is delivered to a transmitter unit 410, which will be described later, in a burst-like manner. At the same time, a transmission initiation signal instructing a start of a transmission is fed to the transmitter unit 410.

The TDMA/TDD processing unit 408 supplies, in the down-link operation, the communication control unit 407 with control signals respectively sent from base stations requesting incoming call connections. The control signals are received by the receiver unit 420, which will be described later, in a repeated or burst manner when the pertinent mobile station is in the wait state. When a speech is to be conducted between the mobile station and the network, this unit 408 passes to the buffer memory 406 a communication signal included in a transmission signal from the nearest base station. Moreover, a frame synchronization (FS) signal contained in the received transmission signal i.e. the channel burst signal is monitored by a frame synchronization sensor circuit, not shown, disposed in the TDMA/TDD processing unit 408.

In this connection, on receiving the communication signal transmitted in the down-link direction from the TDMA/TDD processing unit 408, the buffer memory unit 406 sends the communication signal i.e. the encoded audio signal to the codec A/D converter 405, which in turn converts the received signal into an analog signal to sound the speaker 402 with the obtained signal.

When the control signal requesting an incoming call connection is received from the TDMA/TDD processing unit 408, the communication controller 407 creates a control signal associated with the received control signal to return the resultant control signal to the TDMA/TDD processing unit 408.

The communication control unit 407 ordinarily controls the transmission and reception signal frequencies of the transmitter unit 410 and the receiver unit 420, which will be described later, to be equal to a fixed carrier frequency for the transmission of the control signals. When the pertinent mobile station achieves a speech communication with the network side, the communication controller 407 produces a signal instructing a change of the communication frequencies to the transmitter unit 410 and the receiver unit 420 based on information included in the received control signal, the information being associated with a channel for the communication signal transmission.

In synchronism with an input timing of the control signal delivered from the nearby base station and received by the receiver unit 420, which will be described later, the communication control unit 407 establishes a TDMA frame synchronization of the own mobile station in conformity with the transmission format on the mobile radio communication line. Thereafter, the communication controller 407 operates in a subordinate synchronization with respect to the nearest base station.

The TDMA/TDD processing unit 408 is connected to the transmitter unit 410 and the receiver unit 420 for achieving a radio communication with a base station. Next, a description will be given of the constitution of the transmitter unit 410 and the receiver unit 410.

The configuration of the transmitter unit 410 includes a modulator unit 411 connected to the TDMA/TDD processing unit 408 for modulating a transmission signal received from the TDMA/TDD processing unit 408 and a transmission unit 412 connected to the modulator 411 for transmitting the modulated transmission signal via an antenna 430 and a mobile radio communication line to a nearby base station.

The configuration of the receiver unit 420 comprises a reception unit 421 for receiving a transmission signal of the nearby base station via the mobile radio communication line and the antenna 430. On sensing a reception level of the transmission signal from the base station, the reception unit 421 notifies the reception level in the form of a field sense signal to the TDMA/TDD processing unit 408.

In this constitution, a reference numeral 422 indicates a demodulator unit connected to the reception unit 421 for demodulating the transmission signal sent from the nearby base station into a digital signal, thereby outputting the obtained signal to the TDMA/TDD processing unit 408.

Between the transmission unit 412, the reception unit 421, and the antenna 430, there is disposed an antenna switch 440 for conducting a change-over of the signal connecting direction between the side of the transmission unit 412 and that of the reception unit 421 based on an instruction supplied from the TDMA/TDD processing unit 408.

For example, when the pertinent mobile station receives a control signal requesting a connection request from the nearby base station or when the pertinent mobile station issues a call to the network side, the antenna switch 440 achieves a change-over operation of the transmission and reception states of the mobile station in synchronism with a timing of areas related to the down-link and up-link directions of the TDMA frame in the transmission format on the mobile radio communication path. Ordinarily, the antenna switch 440 is set to a signal connecting direction or point on the side of the reception unit 421 under control of the TDMA/TDD processing unit 408.

The antenna switch 440 and the transmission unit 412 are supplied with a transmission start signal produced from the TDMA/TDD processing unit 408. In response to the transmission start signal, the antenna switch 440 changes the signal connecting direction onto the side of the transmission unit 412. After receiving the transmission signal from the TDMA/TDD processing unit 408 via the modulator unit 411, the transmission unit 412 sends the signal to the nearby base station.

The transmission unit 412 and the reception unit 421 are respectively linked with synthesizer units 413 and 423 each oscillating a signal with a variable frequency. These synthesizers are disposed to arbitrarily change communication frequencies of the transmission unit 412 and the reception unit 421 based on an instruction from the communication control unit 407.

When the pertinent mobile station is in the wait state, each of the synthesizers 413 and 423 oscillates a signal with a frequency such that the transmission unit 412 and the reception unit 421 achieve communications on a carrier fixed or preset to the control signal transmission under control of the communication controller 407. When a speech communication is to be conducted with the network side, the oscillation frequency is varied in association with a free channel selected to transmit a communication signal.

For this purpose, the synthesizers 413 and 423 are configured to receive a communication frequency indication or instruction signal from the communication control unit 407. Namely, in response to the instruction signal, the oscillation frequency is changed according to the indicated frequency in each synthesizer.

2-2-(3). Call Outgoing and Incoming Operations Between Base and Mobile Stations Next, a brief description will be given of the operations of a base station and a mobile station in the call outgoing and incoming operations conducted therebetween in the configuration above.

In the wait state, the base and mobile stations respectively receive control signals transmitted from peripheral base and mobile stations by use of a carrier predetermined for the control signal transmission.

In this connection, the communication control unit 407 of each mobile station establishes, based on the frame synchronization (FS) signal included in a channel burst signal received from a nearby base station, a period of a TDMA frame for a subordinate operation of the pertinent mobile station with respect to the nearby base station. Thereafter, when a speech is to be carried out with the network side, the signal transmission and reception are accomplished according to the period of the TDMA frame thus determined.

The communication control units 305 and 407 respectively of the base and mobile stations monitor the content of the frame synchronization field included in the channel burst signal of the received control signal; whereas, on the side of each base station, the communication control unit 305 monitors the time slot interval of the TDMA frame of each of the base and mobile stations existing in a radio communication zone of the own base station.

In this situation, when the network control unit 301 of the base station receives an incoming signal from the network side, the communication controller 305 delivers, in response thereto, a frequency indication signal of a frequency having a random value to the synthesizer units 313 and 323, thereby changing the reception frequency of the receiver unit 320 in a random fashion.

The communication control unit 305 then monitors, for a period not less than a TDMA frame (T seconds), the field sense signal related to each time slot of the resultant frequency and supplied from the reception unit 321. When an electric field is sensed in either one of the time slots, the monitor operation is further achieved for another frequency in the similar manner.

As a result, when the communication controller 305 detects a time slot where such electric fields are not sensed in the down-link and up-link operations, the time slot is assumed as a free channel, thereby creating a call termination text including information of the free channel. The communication controller 305 then sends the text to the TDMA/TDD processing unit 306 and then supplies the synthesizer units 313 and 323 with a communication frequency indication signal so as to restore the oscillation frequency of the synthesizers 313 and 323 in association with the carrier predetermined for the control signal transmission.

On receiving the call termination text from the communication controller 305, the TDMA/TDD processing unit 306 produces a channel burst signal in the form of a control signal including the text.

The communication controller 305 outputs a transmission start signal to the transmitting unit 312 and the antenna switch 340 and then simultaneously sends the channel burst signal loaded in a TDMA frame determined depending on a timing of the timing pulse supplied from the clock oscillator circuit 304 to the mobile station as a signal destination via the modulator 311, the transmitting unit 312, the antenna switch 340, and the antenna 330.

When the channel burst signal is received on a carrier predetermined for the control signal transmission, the reception unit 421 of the mobile station demodulates the received channel burst signal by the demodulator unit 422 to supply the demodulated signal to the TDMA/TDD processing unit 408, which then outputs information of a free channel contained in the channel burst signal to the communication control unit 407.

The communication controller 407 checks to determine whether or not the channel denoted by the free channel information is available through an operation similar to the free channel search operation conducted by the communication control unit 305 of the base station. When the free channel is confirmed to be available, the communication controller 407 creates an incoming call acknowledge (ACK) text including information of the confirmed free channel and then sends the text to the TDMA/TDD processing unit 408.

When the channel designated by the free channel information is found to be unavailable, the communication controller 407 conducts a channel search for another free channel in an operation similar to the free channel search operation accomplished by the communication control unit 305 of the base station. The controller 407 generates an incoming call negative acknowledge (NAK) text including information of the selected free channel and then transfers the text to the TDMA/TDD processing unit 408.

When sending the incoming call ACK or NAK text to the TDMA/TDD processing unit, the communication control unit 407 simultaneously supplies the synthesizer units 413 and 423 with a communication frequency indication signal to instruct the synthesizers 413 and 423 to restore the oscillation frequency to the original value used in the wait state.

When the incoming call ACK or NAK text is received, the TDMA/TDD processing unit 408 delivers a transmission start signal to the transmission or transmitting unit 312 and the antenna switch 440 and then produces a channel burst signal in the form of a control signal including the ACK or NAK text. This text is sent on a communication frequency of the wait state to the nearby base station via the modulator 411, the transmitting unit 412, the antenna switch 440, and the antenna 430.

On receiving the channel burst signal as the control signal including the incoming call ACK text, the base station initiates a communication with the mobile station through the free channel indicated by the text. Thereafter, the communication unit 305 appropriately achieves a change-over operation on the synthesizer units 313 and 323 and the antenna switch 340 at a timing associated with the free channel.

When the base station receives the channel burst signal as the control signal including the incoming call NAK text, the communication controller 305 thereof conducts a channel check in a similar manner as above to decide whether or not the channel denoted by the selected free channel information is available.

When the free channel is determined to be available, the base station initiates a communication with the mobile station via the free channel indicated by the incoming call ACK text. If the channel has already been reserved for use by another base or mobile station, a channel search is carried out for another free channel. This operation loop is repeatedly achieved until a line disconnection is initiated from the network side or for an appropriate period of time.

In this connection, at a call initiation from a mobile station, the free channel search is accomplished under control of the communication controller 407 of the mobile station. The communication controller 407 then generates a call initiation request text including information of the detected channel in place of the incoming ACK or NAK text created as described above at a call termination from the network side.

The channel burst signal including the call initiation request text is then transmitted to the nearby base station via the TDMA/TDD processing unit 408, the transmitter unit 410, the antenna switch 440, the antenna 430, and the mobile radio communication line. As a result, the base station accomplishes an operation similar to that carried out at a reception of the incoming call ACK or NAK text. Namely, this resultantly initiates communications between the base station and the mobile station. 3. Prevention of interferences during communications When the negotiation for the connection between the base and mobile stations is thus finished, a radio link is established to start the communications therebetween.

However, as described above, since each base station generates a timing pulse in a separate fashion, in a case where a plurality of base (mobile) stations achieve communications by use of different time slots of an identical carrier, there may occur with a lapse of time a collision between channels used by the base (mobile) stations.

In this situation, when a communication is initiated between a base station and a mobile station, the following operations are executed to monitor channels adopted by the other base (mobile) stations so as to estimate channel collisions, thereby preventing channel collisions based on the estimation.

3-1. First Collision Preventing Operation Example

After a communication is started through a channel between a base station and a mobile station, the base and mobile stations are set to a reception state on the channels (i.e. pairs each including a carrier and a time slot) other than the channel acquired for the communication.

That is, each of the stations above is in the reception state in the other time slots of a carrier identical to the carrier obtained by the pertinent station.

In an operation range of the reception state, the communication control units 305 and 407 respectively of the base and mobile stations accomplish control operations to monitor presence or absence of an electric field associated with time slots in the neighborhood of the time slots respectively acquired by the associated stations, namely, presence or absence of channel burst signals transmitted in the neighborhood time slots.

Through the monitor operation, each of the communication controllers 306 and 407 of the respective stations processes time slots preceding the channel thus acquired by the pertinent station as follows. For each of the time slots, an interval of time is measured between the last ramp (R) field of a channel burst signal transmitted by use of the time slot and the first ramp field of the channel burst signal communicated by the own station.

Each of the communication controllers 306 and 407 of the respective stations processes time slots following the channel thus attained by the pertinent station so as to measure, for each of the time slots, an interval of time between the first ramp field of a channel burst signal communicated by the own station and the first ramp field of a channel burst signal transmitted by using the time slot.

Thereafter, when interval of time detected above is gradually minimized to a value e.g. t seconds ($t < <$ time slot) predetermined by the communication controller 305 or 407, the pertinent controller carries out a search, by employing a time slot other than the time slot obtained by the own station, for a free time slot on a carrier identical to that of the channel acquired by the own station. Information of the candidate time slot thus detected is loaded in the SACCH field of a channel burst signal, which is then notified to the communicating station at a signal transmission thereto.

On receiving the information of the candidate time slot to be subsequently used, the station conducts again a check to decide whether or not the notified time slot is actually free or available. If this is the case, an acknowledge (ACK) response is stored in the SACCH field to return the response to the communicating partner. As a result, a time slot transition takes place to the candidate time slot in each of the base and mobile stations in a synchronized manner.

In this case, in order to prevent occurrence of a shift in the transmission timing of communication signals such as an audio signal in association with the transition of the communication time slot, it is assumed to absorb the timing shift in each station prior to the signal transmission.

When there is missing a free time slot on the identical carrier, the reception units 321 and 421 change the respective reception frequencies under control of the respective communication control units 305 and 407 to achieve a search for a free time slot on another carrier. The time slot found on the carrier for the candidate channel is similarly notified to the communicating station as described above.

If the station having received the candidate channel thus reported from the communicating partner recognizes that the channel has already been reserved for use by another base or mobile station, the station on the reception side further makes a search for a candidate channel. When transmitting a negative acknowledge (NAK) text to the partner, the station specifies the obtained candidate channel in the SACCH field of the text.

3-2. Second Collision Preventing Operation Example

In the method of the first collision preventing operation example above, a chance of the collision is estimated depending on an electric field sense signal obtained in association with the channel burst signals of the own station and a station other than the own station. In addition, there exists a method of estimating the chance of the channel collision based on the frame synchronization (FS) field included in the channel burst signal used by the respective stations.

In a frame synchronization sensor circuit, not shown, of each of the TDMA/TDD processing unit 306 and 408, the FS field is sensed to establish a frame synchronization between the own station and a station communicating therewith.

This operation, however, is not accomplished after the frame synchronization is established therebetween. Namely, the frame synchronization sense circuits respectively of the TDMA/TDD processing units 306 and 408 of the associated stations are not used for this purpose after the frame synchronization is finished.

Under the condition above, each station monitors the FS field of a channel burst signal transmitted from a station other than the monitoring station by using another time slot on a carrier identical to that of a channel acquired by the station so as to measure an interval of time between the FS fields transmitted from the communicating partner and the own station, respectively. Based on the measurement of the period of time, a collision between the own channel and the channel of the partner is estimated, thereby causing a channel transition to allocate another channel to the own station.

4. Countermeasurement Against Frequent Operations Preventing Collisions

As described above, each of the reception units 321 and 421 can simultaneously decides, when judging presence or absence of a reception signal in each time slot related to a frequency identical to that of a channel used by the own station, a reception level of the received signal with a satisfactory accuracy.

The reception units 321 and 421 sense a reception level of an interference wave from another station using a channel for which a collision with the channel used by the own station is estimated as described in conjunction with the operations of the first and second collision preventing operation examples and a reception level of a desired wave from a station communicating with the own station via the own channel. The reception levels thus sensed are respectively notified in the form of field sense signals to the communication control units 305 and 407.

For example, in a case where information of the field sense signal is represented with about three bits (eight level resolution=5 dB) and the reception level of the desired wave is greater than that of the interference wave by five levels or more, a chance of the collision between the desired and interference waves is assumed to be ignored.

As a result, after a communication is initiated, any unnecessary channel transition can be dispensed with, namely, it is possible to avoid an occurrence of a disadvantageous situation where the interference preventing operation is frequently achieved.

As described above, in communications achieved via mobile radio communication paths between a plurality of base stations each connected to a network and each independently generating or establishing a synchronization and mobile stations receiving the communication service of the base stations, there are employed communication signal transmitting channels each including a pair of a frequency and a time slot. Namely, it is possible for each base station to select from a plurality of frequencies and a plurality of time slots related to the respective frequencies a pair of frequency and a time slot for the communications. With this provision, the communications above are conducted in a multichannel time division/time duplex communication mode. Each of the base and mobile stations receives a communication signal from a different station achieving a communication with a synchronization independent of the pertinent or own station by use of a different time slot related to a frequency of a channel used by the own station to receive communication signal sent thereto. The station measures an interval between the time slot used by the different station and a time slot of its own. Based on a result of the measurement, the pertinent station estimates a chance of a collision therebetween. Prior to an occurrence of the time slot collision based on a result of the estimation, the own station conducts a search through all free channels not being used in any other stations. Resultantly, a channel transition is conducted simultaneously in the own station and in a station communicating therewith such that in each of the stations, an appropriate free channel is selected therefrom for communications.

According to the present invention, each of the base and mobile stations receives a communication signal from a different station achieving a communication with a synchronization independent of the pertinent or own station by use of a different time slot related to a frequency of a channel used to receive a communication signal sent thereto and a communication signal destined thereto. The pertinent station senses reception signal levels of these communication signals. When a chance of a collision between a time slot of its own and that used by the different station is estimated as a result, the station conducts a comparison between the reception levels respectively of the communication signals above. When it is recognized that the reception level of the communication signal of the different station is strong enough to interfere with the communication signal destined to the own station, the pertinent station accomplishes, before an occurrence of the time slot collision between the time slot of its own and that of the different station, a search operation through all free channels not being used in any other stations. As a result, a channel transition is conducted simultaneously in the own station and a station communicating therewith such that in each of the stations, an appropriate free channel is selected therefrom to be used for communications.

That is, in the own station, a period of a carrier used by a different base station is sensed to be compared with a carrier allocated to the own station so as to detect a fact that a time slot of the carrier used by the different station is in the vicinity of a time slot of the own station. Accordingly, each base station generating a different transmission clock signal to establish a frame synchronization can achieve a channel selection again for a channel change prior to an occurrence of a collision between the time slots of the respective base stations. Consequently, the chance of the collision between the time slots is avoided and hence the multichannel TDMA communication can be easily adopted in a communication environment where a plurality of conventional cordless telephone systems asynchronously operate in the FDMA communication mode.

What is claimed is:

1. A dynamic channel allocation method in mobile radio communication between a plurality of base stations and mobile stations which receive communication service of the base stations, each of the base stations being connected to a network and independently establishing synchronization for the mobile radio communication and having a plurality of communication signal transmission channels each defined by a combination of a frequency and a pair of time slots for transmitting and receiving a communication signal selected from a plurality of frequencies and a plurality of time slots to achieve a time division multiple access (TDMA)/time division duplex (TDD) communication, comprising steps of;

establishing communication between selected base and mobile stations in respective channels;

causing each of the selected base and mobile stations to check whether a communication signal from a different station exists or not which establishes synchronization independently of the selected base and mobile stations and transmits in a different channel having a same frequency as that of the channel used by the selected base and mobile stations and a different time slot from a time slot used by said each of the selected base and mobile stations to receive a communication signal sent thereto;

measuring at each of the selected base and mobile stations, when the communication signal from the different station exists, a difference in time between the time slot used by the different station and the time slot used by said each of the selected base and mobile stations;

estimating at each of the selected base and mobile stations, based on a result of the measurement, an occurrence of an overlap in time between the time slot used by the different station and the time slot used by said each of the selected base and mobile stations;

achieving at each of the selected base and mobile stations, prior to the occurrence of the overlap in time, based on a result of the estimation, a search through all free channels to detect a free channel not being used by any other station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

2. A dynamic channel allocation method according to claim 1 further comprising steps of:

sensing at each of the selected base and mobile stations, when the communication signal from the different station exists, a reception level of the communication signal from the different station to recognize a rising point of the communication signal reception and a falling point thereof;

sensing, based on the rising and falling points, a leading portion and a tailing portion of the time slot used by the different station;

recognizing a position of the time slot used by the different station depending on the leading and tailing portions thus sensed; and recognizing a difference in time between the time slot used by the different station and the time slot used by said each of the selected base and mobile stations.

3. A dynamic channel allocation method according to claim 1 further comprising steps of:

sensing at each of the selected base and mobile stations, when the communication signal from the different station exists, a frame synchronization signal included in the communication signal from the different station;

recognizing a position of the time slot used by the different station depending on the frame synchronization signal included in the communication signal from the different station; and recognizing a difference in time between the time slot used by the different station and the time slot used by said each of the selected base and mobile stations.

4. A dynamic channel allocation method according to claim 1 comprising steps of;

establishing communication between a selected base station and a selected mobile station in a channel;

causing each of the selected base and mobile stations to receive a communication signal destined to said each of the selected base and mobile stations and to check whether a communication signal from a different station exists or not which establishes synchronization independently of the selected base and mobile stations and transmits in a different channel having a same frequency as that of the channel used by the selected base and mobile stations and a different time slot from a time slot used by said each of the selected base and mobile stations to receive a communication signal sent thereto;

sensing at each of the selected base and mobile stations, when the communication signal from the different station exists, a reception signal level of the communication signal destined to said each of the selected base and mobile stations and the communication signal from the different station;

achieving at each of the selected base and mobile stations, when an occurrence of an overlap in time between the time slot used by said each of the selected base and mobile stations and the time slot used by the different station is estimated as a result of the sensing operation, a comparison between the reception levels respectively of the communication signal destined to said each of the selected base and mobile stations and the communication signal from the different station;

achieving at each of the selected base and mobile stations, when it is recognized that the reception level of the communication signal from the different station is strong enough to interfere with the communication signal destined to said each of the selected base and mobile stations, a search through all free channels to detect a free channel not being used by any other station before the occurrence of the overlap in time between the time slot used by said each of the selected base and mobile stations and the time slot used by the different station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

5. A dynamic channel allocation method according to claim 2 comprising steps of;

establishing communication between a selected base station and a selected mobile station in a channel;

causing each of the selected base and mobile stations to receive a communication signal destined to said each of the selected base and mobile stations and to check whether a communication signal from a different station exists or not which establishes synchronization independently of the selected base and mobile stations and transmits in a different channel having a same frequency as that of the channel used by the selected base and mobile stations and a different time slot form a time slot used by said each of the selected base and mobile stations to receive a communication signal sent thereto;

sensing at each of the selected base and mobile stations, when the communication signal from the different station exists, a reception signal level of the communication signal destined to said each of the selected base and mobile stations and the communication signal from the different station;

achieving at each of the selected base and mobile stations, when an occurrence of an overlap in tie between the time slot used by said each of the selected base and mobile stations and the time slot used by the different station is estimated as a result of the sensing operation, a comparison between the reception levels respectively of the communication signal destined to said each of the selected base and mobile stations and the communication signal from the different station;

achieving at each of the selected base and mobile stations, when it is recognized that the reception level of the communication signal from the different station is strong enough to interfere with the communication signal destined to said each of the selected base and mobile stations, a search through all free channels to detect a free channel not being used by any other station before the occurrence of the overlap in time between the time slot used by said each of the selected base and mobile stations and the time slot used by the different station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

6. A dynamic channel allocation method according to claim 3 comprising steps of;

establishing communication between a selected base station and a selected mobile station in a channel;

causing each of the selected base and mobile stations to receive a communication signal destined to said each of the selected base and mobile stations and to check whether a communication signal from a different station exists or not which establishes synchronization independently of the selected base and mobile stations and transmits in a different channel having a same frequency as that of the channel used by the selected base and mobile stations and a different time slot from a time slot used by said each of the selected base and mobile stations to receive a communication signal sent thereto;

sensing at each of the selected base and mobile stations, when the communication signal from the different station exits, a reception signal level of the communication signal destined to said each of the selected base and mobile stations and the communication signal from the different station;

achieving at each of the selected base and mobile stations, when an occurrence of an overlap in time between the time slot used by said each of the selected base and mobile stations and the time slot used by the different station is estimated as a result of the sensing operation, a comparison between the reception levels respectively of the communication signal destined to said each of the selected base and mobile stations and the communication signal from the different station;

achieving at each of the selected base and mobile stations, when it is recognized that the reception level of the communication signal from the different station is strong enough to interfere with the communication signal destined to said each of the selected base and mobile stations, a search through all free channels to detect a free channel not being used by any other station before the occurrence of the overlap in time between the time slot used by said each of the selected base and mobile stations and time slot used by the different station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

7. A dynamic channel allocation method according to claim 1 comprising steps of;

establishing communication between a selected base station and a selected mobile station in á channel;

setting as identification points a point of time prior to a leading portion of a time slot used by each of the selected base and mobile stations to receive a communication signal sent thereto and a point of time posterior to a tailing portion of the time slot;

causing said each of the selected base and mobile stations to check whether a communication signal from a different station exists or not which establishes synchronization independently of the selected base and mobile stations and transmits in a different channel having a same frequency as that of the channel used by the selected base and mobile stations and a different time slot from the time slot used by said each of the selected base and mobile stations to receive a communication signal sent thereto;

detecting at each of the selected base and mobile stations, when the communication signal from the different station exists, a state wherein at least one of a leading portion and a tailing portion and a frame synchronization signal field of the time slot used by the different station exists at a point in a range between the identification points;

estimating at each of the selected base and mobile stations, at a detection of the state, an occurrence of an overlap in time between the time slot used by the different station and the time slot used by said each of the selected base and mobile stations;

achieving at each of the selected base and mobile stations, prior to the occurrence of the overlap in time, based on a result of the estimation, a search through all free channels to detect a free channel not being used by any other station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

8. A dynamic channel allocation method according to claim 2 comprising steps of;

establishing communication between a selected base station and a selected mobile station in a channel;

setting as identification points a point of time prior to a leading portion of a time slot used by each of the selected base and mobile stations to receive a communication signal sent thereto and a point of time posterior to a tailing portion of the time slot;

causing said each of the selected base and mobile stations to check whether a communication signal from a different station exists or not which establishes synchronization independently of the selected base and mobile stations and transmits in a different channel having a same frequency as that of the channel used by the selected base and mobile stations and a different time slot from the time slot used by said each of the selected base and mobile stations to receive a communication signal sent thereto;

detecting at each of the selected base and mobile stations, when the communication signal from the different station exists, a state wherein at least one of a leading portion and a tailing portion and a frame synchronization signal field of the time slot used by the different station exists at a point in a range between the identification points;

estimating at each of the selected base and mobile stations, at a detection of the state, an occurrence of an overlap in time between the time slot used by the different station and the time slot used by said each of the selected base and mobile stations;

achieving at each of the selected base and mobile stations, prior to the occurrence of the overlap in time, based on a result of the estimation, a search through all free channels to detect a free channel not being used by any other station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

9. A dynamic channel allocation method according to claim 3 comprising steps of;

establishing communication between a selected base station and a selected mobile station in a channel;

setting as identification points a point of time prior to a leading portion of a time slot used by each of the selected base and mobile stations to receive a communication signal sent thereto and a point of time posterior to a tailing portion of the time slot;

causing said each of the selected base and mobile stations to check whether a communication signal from a different station exists or not which establishes synchronization independently of the selected base and mobile stations and transmits in a different channel having a same frequency as that of the channel used by the selected base and mobile stations and a different time slot from the time slot used by said each of the selected base and mobile stations to receive a communication signal sent thereto;

detecting at each of the selected base and mobile stations, when the communication signal from the different station exists, a state wherein at least one of a leading portion and a tailing portion and a frame synchronization signal field of the time slot used by the different station exists at a point in a range between the identification points;

estimating at each of the selected base and mobile stations, at a detection of the state, an occurrence of an overlap in time between the time slot used by the different station and the time slot used by said each of the selected base and mobile stations;

achieving at each of the selected base and mobile stations, prior to the occurrence of the overlap in time, based on a result of the estimation, a search through all free channels to detect a free channel not being used by any other station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

10. A dynamic channel allocation method according to claim 4 comprising steps of;

establishing communication between a selected base station and a selected mobile station in a channel;

setting as identification points a point of time prior to a leading portion of a time slot used by each of the selected base and mobile stations to receive a communication signal sent thereto and a point of time posterior to a tailing portion of the time slot;

causing said each of the selected base and mobile stations to check whether a communication signal from a different station exists or not which establishes synchronization independently of the selected base and mobile stations and transmits in a different channel having a same frequency as that of the channel used by the selected base and mobile stations and a different time slot from the time slot used by said each of the selected base and mobile stations to receive a communication signal sent thereto;

detecting at each of the selected base and mobile stations, when the communication signal from the different station exists, a state wherein at least one of a leading portion and a tailing portion and a frame synchronization signal field of the time slot used by the different station exists at a point in a range between the identification points;

estimating at each of the selected base and mobile stations, at a detection of the state, an occurrence of an overlap in time between the time slot used by the different station and the time slot used by said each of the selected base and mobile stations;

achieving at each of the selected base and mobile stations, prior to the occurrence of the overlap in time, based on a result of the estimation, a search through all free channels to detect a free channel not being used by any other station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

11. A dynamic channel allocation method according to claim 5 comprising steps of;

establishing communication between a selected base station and a selected mobile station in a channel;

setting as identification points a point of time prior to a leading portion of a time slot used by each of the selected base and mobile stations to receive a communication signal sent thereto and point of time posterior to a tailing portion of the time slot;

causing said each of the selected base and mobile stations to check whether a communication signal from a different station exists or not which establishes synchronization independently of the selected base and mobile stations and transmits in a different channel having a same frequency as that of the channel used by the selected base and mobile stations and a different time slot from the time slot used by said each of the selected base and mobile stations to receive a communication signal sent thereto;

detecting at each of the selected base and mobile stations, when the communication signal from the different station exists, a state wherein at least one of a leading portion and a tailing portion and a frame synchronization signal field of the time slot used by the different station exists at a point in a range between the identification points;

estimating at each of the selected base and mobile stations, at a detection of the state, an occurrence of an overlap in time between the time slot use by the different station and the time slot used by said each of the selected base and mobile stations;

achieving at each of the selected base and mobile stations, prior to the occurrence of the overlap in time, based on a result of the estimation, a search through all free channels to detect a free channel not being used by any other station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

12. A dynamic channel allocation method according to claim 6 comprising steps of;

establishing communication between a selected base station and a selected mobile station in a channel;

setting as identification points a point of time prior to a leading portion of a time slot used by each of the selected base and mobile stations to receive a communication signal sent thereto and a point of time posterior to a tailing portion of the time slot;

causing said each of the selected base and mobile stations to check whether a communication signal from a different station exists or not which establishes synchronization independently of the selected base and mobile stations and transmits in a different channel having a same frequency as that of the channel used by the selected base and mobile stations and a different time slot from the time slot used by said each of the selected base and mobile stations to receive a communication signal sent thereto;

detecting at each of the selected base and mobile stations, when the communication signal from the different station exists, a state wherein at least one of a leading portion and a tailing portion and a frame synchronization signal field of the time slot used by the different station exists at a point in a range between the identification points;

estimating at each of the selected base and mobile stations, at a detection of the state, an occurrence of an overlap in time between the time slot used by the different station and the time slot used by said each of the selected base and mobile stations;

achieving at each of the selected base and mobile stations, prior to the occurrence of the overlap in time, based on a result of the estimation, a search through all free channels to detect a free channel not being used by any other station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

13. A dynamic channel allocation method according to claim 1 comprising steps of;

establishing communication between a selected base station and a selected mobile station in a channel;

causing each of the selected base and mobile stations to receive a communication signal destined to said each of the selected base and mobile stations and to check whether a communication signal from a different station exists or not which establishes synchronization independently of the selected base and mobile stations and transmits in a different channel having a same frequency as that of the channel used by the selected base and mobile stations and a different time slot from a time slot used by said each of the selected base and mobile stations to receive a communication signal sent thereto;

recognizing at each of the selected base and mobile stations, when the communication signal from the different station exists, at least one of a leading portion and a tailing portion and a frame synchronization signal field of the time slot used by said each of the selected base and mobile stations to receive a communication signal sent thereto and at least one of a leading portion and a tailing portion and a frame synchronization signal field of the time slot used by the different station, whereby recognizing a position of the time slot used by said each of the base and mobile stations and a position of the time slot used by the different station;

detecting at each of the selected base and mobile station a change with respect to a lapse of time in a relative positional relationship between at least one of the leading portion and the tailing portion and the frame synchronization signal field of the time slot used by said each of the selected base and mobile stations and at least one of the leading portion and the tailing portion and the frame synchronization signal field of the time slot used by the different station;

computing at each of the selected base and mobile stations a relative moving speed of the time slot used by the different station in reference to the time slot used by said each of the selected base and mobile stations;

achieving at each of the selected base and mobile stations a computation to estimate a point of time when the time slot used by said each of the selected base and mobile stations to receive a communication signal sent thereto overlaps in time with the time slot used by the different station based on the relative moving speed of the time slot used by the different station in reference to the time slot used by said each of the selected base and mobile stations and on the positions of the time slot used by said each of the selected base and mobile stations and the time slot used by the different station;

achieving at each of the selected base and mobile stations, prior to an occurrence of the overlap in time, based on a result of the computation, a search through all free channels to detect a free channel not being used by any other station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

14. A dynamic channel allocation method according to claim 2 comprising steps of;

establishing communication between a selected base station and a selected mobile station in a channel;

causing each of the selected base and mobile stations to receive a communication signal destined to said each of the selected base and mobile stations and to check whether a communication signal from a different station exists or not which establishes synchronization independently of the selected base and mobile stations and transmits in a different channel having a same frequency as that of the channel used by the selected base and mobile stations and a different time slot from a time slot used by said each of the selected base and mobile stations to receive a communication signal sent thereto;

recognizing at each of the selected base and mobile stations, when the communication signal from the different station exists, at least one of a leading portion and a tailing portion and a frame synchronization signal field of the time slot used by said each of the selected base and mobile stations to receive a communication signal sent thereto and at least one of a leading portion and a tailing portion and a frame synchronization signal field of the time slot used by the different station, whereby recognizing a position of the time slot used by said each of the base and mobile stations and a position of the time slot used by the different station;

detecting at each of the selected base and mobile stations a change with respect to a lapse of time in a relative positional relationship between at least one of the leading portion and the tailing portion and the frame synchronization signal field of the time slot used by said each of the selected base and mobile stations and at least one of the leading portion and the tailing portion and the frame synchronization signal field of the time slot used by the different station;

computing at each of the selected base and mobile stations a relative moving speed of the time slot used by the different station in reference to the time slot used by said each of the selected base and mobile stations;

achieving at each of the selected base and mobile stations a computation to estimate a point of time when the time slot used by said each of the selected base and mobile stations to receive a communication signal sent thereto overlaps in time with the time slot used by the different station based on the relative moving speed of the time slot used by the different station in reference to the time slot used by said each of the selected base and mobile stations and on the positions of the time slot used by said each of the selected base and mobile stations and the time slot used by the different station;

achieving at each of the selected base and mobile stations, prior to an occurrence of the overlap in time, based on a result of the computation, a search through all free channels to detect a free channel not being used by any other station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

15. A dynamic channel allocation method according to claim 3 comprising steps of;

establishing communication between a selected base station and a selected mobile station in a channel;

causing each of the selected base and mobile stations to receive a communication signal destined to said each of the selected base and mobile stations and to check whether a communication signal from a different station exists of not which establishes synchronization independently of the selected base and mobile stations and transmits in a different channel having a same frequency as that of the channel used by the selected base and mobile stations and a different time slot from a time slot used by said each of the selected base and mobile stations to receive a communication signal sent thereto;

recognizing at each of the selected base and mobile stations, when the communication signal from the different station exits, at least one of a leading portion and a tailing portion and a frame synchronization signal field of the time slot used by said each of the selected base and mobile stations to receive a communication signal sent thereto and at least one of a leading portion and a tailing portion and a frame synchronization signal field of the time slot used by the different station, whereby recognizing a position of the time slot used by said each of the base and mobile stations and a position of the time slot used by the different station;

detecting at each of the selected base and mobile stations a change with respect to a lapse of time in a relative positional relationship between at least one of the leading portion and the tailing portion and the frame synchronization signal field of the time slot used by said each of the selected base and mobile stations and at least one of the leading portion and the tailing portion and the frame synchronization signal field of the time slot used by the different station;

computing at each of the selected base and mobile stations a relative moving speed of the time slot used by the different station in reference to the time slot used by said each of the selected base and mobile stations;

achieving at each of the selected base and mobile stations a computation to estimate a point of time when the time slot used by said each of the selected base and mobile stations to receive a communication signal sent thereto overlaps in time with the time slot used by the different station based on the relative moving speed of the time slot used by the different station in reference to the time slot used by said each of the selected base and mobile stations and on the positions of the time slot used by said each of the selected base and mobile stations and the time slot used by the different station;

achieving at each of the selected base and mobile stations, prior to an occurrence of the overlap in time, based on a result of the computation, a search through all free channels to detect a free channel not being used by any other station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

16. A dynamic channel allocation method according to claim 4 comprising steps of;

establishing communication between a selected base station and a selected mobile station in a channel;

causing each of the selected base and mobile stations to receive a communication signal destined to said each of the selected base and mobile stations and to check whether a communication signal from a different station exists or not which establishes synchronization independently of the selected base and mobile stations and transmits in a different channel having a same frequency as that of the channel used by the selected base and mobile stations and a different time slot from a time slot used by said each of the selected base and mobile stations to receive a communication signal sent thereto;

recognizing at each of the selected base and mobile stations, when the communication signal from the different station exists, at least one of a leading portion and a tailing portion and a frame synchronization signal field of the time slot used by said each of the selected base and mobile stations to receive a communication signal sent thereto and at least one of a leading portion and a tailing portion and a frame synchronization signal field of the time slot used by the different stations, whereby recognizing a position of the time slot used by said each of the base and mobile stations and a position of the time slot used by the different station;

detecting at each of the selected base and mobile stations a change with respect to a lapse of time in a relative positional relationship between at least one of the leading portion and the tailing portion and the frame synchronization signal field of the time slot used by said each of the selected base and mobile stations and at least one of the leading portion and the tailing portion and the frame synchronization signal field of the time slot used by the different station;

computing at each of the selected base and mobile stations a relative moving speed of the time slot used by the different station in reference to the time slot used by said each of the selected base and mobile stations;

achieving at each of the selected base and mobile stations a computation to estimate a point of time when the time slot used by said each of the selected base and mobile stations to receive a communication signal sent thereto overlaps in time with the time slot used by the different station based on the relative moving speed of the time slot used by the different station in reference to the time slot used by said each of the selected base and mobile stations and on the positions of the time slot used by said each of the selected base and mobile stations and the time slot used by the different station;

achieving at each of the selected base and mobile stations, prior to an occurrence of the overlap in time, based on a result of the computation, a search through all free channels to detect a free channel not being used by any other station;

causing one of the selected base and mobile stations which has detected the free channel to inform the other of the selected base and mobile stations about the free channel; and conducting at the selected base station, when the free channel has been detected, a channel transition from the channel use by the selected base and mobile stations to the free channel, thereby allocating the free channel to the selected base and mobile stations.

17. A dynamic channel allocation method according to claim 5 comprising steps of;

establishing communication between a selected base station and a selected mobile station in channel;

causing each of the selected base and mobile stations to receive a communication signal destined to said each of the selected base and mobile stations and to check whether a communication signal from a different station exists or not which establishes synchronization independently of the selected base and mobile stations and transmits in a different channel having a same frequency as that of the channel used by the selected base and mobile stations and a different time slot from a time slot used by said each of the selected base and mobile stations to receive a communication signal sent thereto;

recognizing at each of the selected base and mobile stations, when the communication signal from the different station exists, at least one of a leading portion and a tailing portion and frame synchronization signal field of the time slot used by said each of the selected base and mobile stations to receive a communication signal sent thereto and at lest one of a leading portion and a tailing portion and a frame synchronization signal field of the time slot used by the different station. whereby recognizing a position of the time slot used by said each of the base and mobile stations and a position of the time slot used by the different station;

detecting at each of the selected base and mobile stations a change with respect to a lapse of time in a relative positional relationship between at least one of the leading portion and the tailing portion and the frame synchronization signal field of the time slot used by said each of the selected base and mobile stations and at least one of the leading portion and the tailing portion and the frame synchronization signal field of the time slot used by the different station;

computing at each of the selected base and mobile stations a relative moving speed of the time slot used by the different station in reference to the time slot used by said each of the selected base and mobile stations;

achieving at each of the selected base and mobile stations a computation to estimate a point of time when the time slot used by said each of the selected base and mobile stations to receive a communication signal sent thereto overlaps in time with the time slot used by the different station based on the relative moving speed of the time slot used by the different station in reference to the time slot used by said each of the selected base and mobile stations and on the positions of the time slot used by said each of the selected base and mobile stations and the time slot used by the different station;

achieving at each of the selected base and mobile stations, prior to an occurrence of the overlap in time, based on a result of the computation, a search through all free channels to detect a free channel not being used by any other station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

18. A dynamic channel allocation method according to claim 6 comprising steps of;

establishing communication between a selected base station and a selected mobile station in a channel;

causing each of the selected base and mobile stations to receive a communication signal destined to said each of the selected base and mobile stations and to check whether a communication signal from a different station exists or not which establishes synchronization independently of the selected base and mobile stations and transmits in a different channel having a same frequency as that of the channel used by the selected base and mobile stations and a different time slot from a time slot used by said each of the selected base and mobile stations to receive a communication signal sent thereto;

recognizing at each of the selected base and mobile stations, when the communication signal from the different station exists, at least one of a leading portion and a tailing portion and a frame synchronization signal field of the time slot used by said each of the selected base and mobile stations to receive a communication signal sent thereto and at least one of a leading portion and a tailing portion and a frame synchronization signal field of the time slot used by the different station, whereby recognizing a position of the time slot used by said each of the base and mobile stations and a position of the time slot used by the different station;

detecting at each of the selected base and mobile stations a change with respect to a lapse of time in a relative positional relationship between at least one of the leading portion and the tailing portion and the frame synchronization signal field of the time slot used by said each of the selected base and mobile stations and at lest one of the leading portion and the tailing portion and the frame synchronization signal field of the time slot used by the different station;

computing at each of the selected base and mobile stations a relative moving speed of the time slot used by the different station in reference to the time slot used by said each of the selected base and mobile stations;

achieving at each of the selected base and mobile stations a computation to estimate a point of time when the time slot used by said each of the selected base and mobile stations to receive a communication signal sent thereto overlaps in time with the time slot used by the different station based on the relative moving speed of the time slot used by the different station in reference to the time slot used by said each of the selected base and mobile stations and on the positions of the time slot used by said each of the selected base and mobile stations and the time slot used by the different station;
achieving at each of the selected base and mobile stations, prior to an occurrence of the overlap in time, based on a result of the computation, a search through all free channels to detect a free channel not being used by any other station;
causing one of the selected base and mobile stations which has detected the free channel to inform the other of the selected base and mobile stations about the free channel; and
conducting at the selected base station, when the free channel has been detected, a channel transition from the channel used by the selected base and mobile stations to the free channel, thereby allocating the free channel to the selected base and mobile stations.

19. A dynamic channel allocation method according to claim 7 comprising steps of:
establishing communication between a selected base station and a selected mobile station in a channel;
causing each of the selected base and mobile stations to receive a communication signal destined to said each of the selected base and mobile stations and to check whether a communication signal from a different station exists or not which establishes synchronization independently of the selected base and mobile stations and transmits in a different channel having a same frequency as that of the channel used by the selected base and mobile stations and a different time slot from a time slot used by said each of the selected base and mobile stations to receive a communication signal sent thereto;
recognizing at each of the selected base and mobile stations, when the communication signal from the different station exists, at least one of a leading portion and a tailing portion and a frame synchronization signal field of the time slot used by said each of the selected base and mobile stations to receive a communication signal sent thereto and at least one of a leading portion and a tailing portion and a frame synchronization signal field of the time slot used by the different station, whereby recognizing a position of the time slot used by said each of the base and mobile stations and a position of the time slot used by the different station;
detecting at each of the selected base and mobile stations a change with respect to a lapse of time in a relative positional relationship between at least one of the leading portion and the tailing portion an the frame synchronization signal field of the time slot used by said each of the selected base and mobile stations and at least one of the leading portion and the tailing portion and the frame synchronization signal field of the time slot used by the different station;
computing at each of the selected base and mobile stations a relative moving speed of the time slot used by the different station in reference to the time slot used by said each of the selected base and mobile stations;
achieving at each of the selected base and mobile stations a computation to estimate a point of time when the time slot used by said each of the selected base and mobile stations to receive a communication signal sent thereto overlaps in time with the time slot used by the different station based on the relative moving speed of the time slot used by the different station in reference to the time slot used by said each of the selected base and mobile stations and on the positions of the time slot used by said each of the selected base and mobile stations and the time slot used by the different station;
achieving at each of the selected base and mobile stations, prior to an occurrence of the overlap in time, based on a result of the computation, a search through all free channels to detect a free channel not being used by any other station;
causing one of the selected base and mobile stations which has detected the free channel to inform the other of the selected base and mobile stations about the free channel; and
conducting at the selected base station, when the free channel has been detected, a channel transition from the channel used by the selected base and mobile stations to the free channel, thereby allocating the free channel to the selected base and mobile stations.

20. A dynamic channel allocation method according to claim 8 comprising steps of:
establishing communication between a selected base station and a selected mobile station in a channel;
causing each of the selected base and mobile stations to receive a communication signal destined to said each of the selected base and mobile stations and to check whether a communication signal from a different station exists or not which establishes synchronization independently of the selected base and mobile stations and transmits in a different channel having a same frequency a that of the channel used by the selected base and mobile stations and a different time slot from a time slot used by said each of the selected base and mobile stations to receive a communication signal sent thereto;
recognizing at each of the selected base and mobile stations, when the communication signal from the different station exists, at least one of a leading portion and tailing portion and a frame synchronization signal field of the time slot used by said each of the selected base and mobile stations to receive a communication signal sent thereto and at least one of a leading portion and a tailing portion and a frame synchronization signal field of the time slot used by the different station, whereby recognizing a position of the time slot used by said each of the base and mobile stations and a position of the time slot used by the different station;
detecting at each of the selected base and mobile stations a change with respect to a lapse of time in a relative positional relationship between at least one of the leading portion and the tailing portion and the frame synchronization signal field of the time slot used by said each of the selected base and mobile stations and at least one of the leading portion and the tailing portion and the frame synchronization signal field of the time slot used by the different station;
computing at each of the selected base and mobile stations a relative moving speed of the time slot used by the different station in reference to the time slot used by said each of the selected base and mobile stations;

achieving at each of the selected base and mobile stations a computation to estimate a point of time when the tie slot used by said each of the selected base and mobile stations to receive a communication signal sent thereto overlaps in time with the time slot used by the different station based on the relative moving speed of the time slot used by the different station in reference to the time slot used by said each of the selected base and mobile stations and on the positions of the time slot used by said each of the selected base and mobile stations and the time slot used by the different station;

achieving at each of the selected base and mobile stations, prior to an occurrence of the overlap in time, based on a result of the computation, a search through all free channels to detect a free channel not being used by any other station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

21. A dynamic channel allocation method according to claim 9 comprising steps of;

establishing communication between a selected base station and a selected mobile station in a channel;

causing each of the selected base and mobile stations to receive a communication signal destined to said each of the selected base and mobile stations and to check whether a communication signal from a different station exists or not which establishes synchronization independently of the selected base and mobile stations and transmits in a different channel having a same frequency as that of the channel used by the selected base and mobile stations and a different time slot form a time slot used by said each of the selected base and mobile stations to receive a communication signal sent thereto;

recognizing at each of the selected base and mobile stations, when the communication signal from the different station exists, at least one of a leading portion and a tailing portion and a frame synchronization signal field of the time slot used by said each of the selected base and mobile stations to receive a communication signal sent thereto and at least one of a leading portion and a tailing portion and a frame synchronization signal field of the time slot used by the different station, whereby recognizing a position of the time slot used by said each of the base and mobile stations and a position of the time slot used by the different station;

detecting at each of the selected base and mobile stations a change with respect to a lapse of time in a relative positional relationship between at least one of the leading portion and the tailing portion and the frame synchronization signal field of the time slot used by said each of the selected base and mobile stations and at least one of the leading portion and the tailing portion and the frame synchronization signal field of the time slot used by the different station;

computing at each of the selected base ad mobile stations a relative moving speed of the time slot used by the different station in reference to the time slot used by said each of the selected base and mobile stations;

achieving at each of the selected base and mobile stations a computation to estimate a point of time when the time slot used by said each of the selected base and mobile stations to receive a communication signal sent thereto overlaps in time with the time slot used by the different station based on the relative moving speed of the time slot used by the different station in reference to the time slot used by said each of the selected base and mobile stations and on the positions of the time slot used by said each of the selected base and mobile stations and the time slot used by the different station;

achieving at each of the selected base and mobile stations, prior to an occurrence of the overlap in time, based on a result of the computation, a search through all free channels to detect a free channel not being used by any other station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

22. A dynamic channel allocation method according to claim 10 comprising the steps of;

establishing communication between a selected base station and a selected mobile station in a channel;

causing each of the selected base and mobile stations to receive a communication signal destined to said each of the selected base and mobile stations and to check whether a communication signal from a different station exists or not which establishes synchronization independently of the selected base and mobile stations and transmits in a different channel having a same frequency as that of the channel used by the selected base and mobile stations and a different time slot from a time slot used by said each of the selected base and mobile stations to receive a communication signal sent thereto;

recognizing at each of the selected base and mobile stations, when the communication signal from the different station exists, at least one of a leading portion and a tailing portion and a frame synchronization signal field of the time slot used by said each of the selected base and mobile stations to receive a communication signal sent thereto and at least one of a leading portion and a tailing portion and a frame synchronization signal field of the time slot used by the different station, whereby recognizing a position of the time slot used by said each of the base and mobile stations and a position of the time slot used by the different station;

detecting at each of the selected base and mobile stations a change with respect to a lapse of time in a relative positional relationship between at least one of the leading portion and the tailing portion and the frame synchronization signal field of the time slot used by said each of the selected base and mobile stations and at least one of the leading portion and the tailing portion and the frame synchronization signal field of the time slot used by the different station;

computing at each of the selected base and mobile stations a relative moving speed of the time slot used by the different station in reference to the time slot used by said each of the selected base and mobile stations;

achieving at each of the selected base and mobile stations a computation to estimate a point of time when the time slot used by said each of the selected base and mobile stations to receive a communication signal sent thereto overlaps in time with the time slot used by the different station based on the relative moving speed of the time slot used by the different station in reference to the time slot used by said each of the selected base and mobile stations and on the positions of the time slot used by said each of the selected base and mobile stations and the time slot used by the different station;

achieving att each of the selected base and mobile stations, prior to an occurrence of the overlap in time, based on a result of the computation, a search through all free channels to detect a free channel not being used by any other station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

23. A dynamic channel allocation method according to claim 11 comprising steps of;

establishing communication between a selected base station and a selected mobile station in a channel;

causing each of the selected base and mobile stations to receive a communication signal destined to said each of the selected base and mobile stations and to check whether a communication signal from a different station exists or not which establishes synchronization independently of the selected base and mobile stations ad transmits in a different channel having a same frequency as that of the channel used by the selected base and mobile stations and a different time slot from a time slot used by said each of the selected base and mobile stations to receive a communication signal sent thereto;

recognizing at each of the selected base and mobile stations, when the communication signal from the different station exists, at least one of a leading portion and a tailing portion and a frame synchronization signal field of the time slot used by said each of the selected base and mobile stations to receive a communication signal sent thereto and at least one of a leading portion and a tailing portion and a frame synchronization signal field of the time slot used by the different station, whereby recognizing a position of the time slot used by said each of the base and mobile stations and a position of the time slot used by the different station;

detecting at each of the selected base and mobile stations a change with respect to a lapse of time in a relative positional relationship between at least one of the leading portion and the tailing portion and the frame synchronization signal field of the time slot used by said each of the selected base and mobile stations and at least one of the leading portion and the tailing portion and the frame synchronization signal field of the time slot used by the different station;

computing at each of the selected base and mobile stations a relative moving speed of the time slot used by the different station in reference to the time slot used by said each of the selected base and mobile stations;

achieving at each of the selected base and mobile stations a computation to estimate a point of time when the time slot used by said each of the selected base and mobile stations to receive a communication signal sent thereto overlaps in time with the time slot used by the different station based on the relative moving speed of the time slot used by the different station in reference to the time slot used by said each of the selected base and mobile stations and on the positions of the time slot used by said each of the selected base and mobile stations and the time slot used by the different station;

achieving at each of the selected base and mobile stations, prior to an occurrence of the overlap in time, based on a result of the computation, a search through all free channels to detect a free channel not being used by any other station;

causing one of the selected base and mobile stations which has detected the free channel to inform the other of the selected base and mobile stations about the free channel; and conducting at the selected base station, when the free channel has been detected, a channel transition from the channel used by the selected base and mobile stations to the free channel, thereby allocating the free channel to the selected base and mobile stations.

24. A dynamic channel allocation method according to claim 12 comprising steps of;

establishing communication between a selected base station and a selected mobile station in a channel;

causing each of the selected base and mobile stations to receive a communication signal destined to said each of the selected base and mobile stations and to check whether a communication signal from a different station exists or not which establishes synchronization independently of the selected base and mobile stations and transmits in a different channel having a same frequency as that of the channel used by the selected base and mobile stations and a different time slot form a time slot used by said each of the selected base and mobile stations to receive a communication signal sent thereto;

recognizing at each of the selected base and mobile stations, when the communication signal from the different station exists, at least one of a leading portion and a tailing portion and a frame synchronization signal field of the time slot used by said each of the selected base and mobile stations to receive a communication signal sent thereto and at least one of a leading portion and a tailing portion and a frame synchronization signal field of the time slot used by the different station, whereby recognizing a position of the time slot used by said each of the base and mobile stations and a position of the time slot used by the different station;

detecting at each of the selected base and mobile stations a change with respect to a lapse of time in a relative positional relationship between at least one of the leading portion and the tailing portion and the frame synchronization signal field of the time slot used by said each of the selected base and mobile stations and at least one of the leading portion and the tailing portion and the frame synchronization signal field of the time slot used by the different station;

computing at each of the selected base and mobile stations a relative moving speed of the time slot used by the different station in reference to the time slot used by said each of the selected base and mobile stations;

achieving at each of the selected base and mobile stations a computation to estimate a point of time when the time slot used by said each of the selected base and mobile stations to receive a communication signal sent thereto overlaps in time with the time slot used by the different station based on the relative moving speed of the time slot used by the different station in reference to the time slot used by said each of the selected base and mobile stations and on the positions of the time slot used by said each of the selected base and mobile stations and the time slot used by the different station;

achieving at each of the selected base and mobile stations, prior to an occurrence of the overlap in time, based on a result of the computation, a search through all free channels to detect a free channel not being used by any other station;

causing one of the selected base and mobile stations which has detected the free channel to inform the other of the selected base and mobile stations aobut the free channel; and conducting at the selected base station, when the free channel has been detected, a channel transition from the channel used by the selected base and mobile stations to the free channel, thereby allocating the free channel to the selected base and mobile stations.

* * * * *